(12) United States Patent
Kim et al.

(10) Patent No.: US 12,547,052 B2
(45) Date of Patent: Feb. 10, 2026

(54) CAMERA MODULE

(71) Applicant: Samsung Electro-Mechanics Co.,Ltd., Suwon-si (KR)

(72) Inventors: Su Kyeong Kim, Suwon-si (KR); Nam Ki Park, Suwon-si (KR); Bo Sung Seo, Suwon-si (KR); Soo Cheol Lim, Suwon-si (KR); Je Ho Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 120 days.

(21) Appl. No.: 18/383,645

(22) Filed: Oct. 25, 2023

(65) Prior Publication Data

US 2024/0369913 A1 Nov. 7, 2024

(30) Foreign Application Priority Data

May 3, 2023 (KR) .................. 10-2023-0057545

(51) Int. Cl.
*G03B 30/00* (2021.01)
*G03B 13/36* (2021.01)
(Continued)

(52) U.S. Cl.
CPC ............. *G03B 13/36* (2013.01); *G03B 30/00* (2021.01); *H04N 23/55* (2023.01); *G02B 27/646* (2013.01);
(Continued)

(58) Field of Classification Search
CPC ....... G02B 7/09; G02B 27/646; H04N 23/687
See application file for complete search history.

(56) References Cited

U.S. PATENT DOCUMENTS

| 2019/0196137 A1* | 6/2019 | Ushioda ................. G03B 13/36 |
| 2022/0099917 A1* | 3/2022 | Seo ....................... G02B 27/646 |
| 2022/0155652 A1 | 5/2022 | Seo et al. |

FOREIGN PATENT DOCUMENTS

| CN | 113721408 A * 11/2021 | ............... G03B 5/00 |
| KR | 10-2011-0009779 A | 1/2011 |

(Continued)

OTHER PUBLICATIONS

Korean Office Action issued on Jun. 22, 2025, in counterpart Korean Patent Application No. 10-2023-0057545 (5 pages in English, 4 pages in Korean).

*Primary Examiner* — Leon W Rhodes, Jr.
(74) *Attorney, Agent, or Firm* — NSIP Law

(57) ABSTRACT

A camera module includes a housing having an internal space; a carrier disposed in the internal space; a lens module disposed in the carrier; a guide frame disposed between the carrier and the lens module; a first ball member and a second ball member disposed between the housing and the carrier, spaced apart from each other in a diagonal direction of the housing and the carrier, and configured to guide a movement of the carrier in a direction of an optical axis; and a third ball member disposed between the carrier and the guide frame, and a fourth ball member disposed between the guide frame and the lens module, and configured to guide a movement of the lens module in a direction perpendicular to the optical axis direction, wherein the third ball member and the fourth ball member do not overlap each other in the optical axis direction.

15 Claims, 16 Drawing Sheets

(51) Int. Cl.
  *H04N 23/55* (2023.01)
  *H04N 23/57* (2023.01)
  *G02B 27/64* (2006.01)
(52) U.S. Cl.
  CPC ...... *G03B 2205/0069* (2013.01); *H04N 23/57* (2023.01)

(56) References Cited

FOREIGN PATENT DOCUMENTS

| | | |
|---|---|---|
| KR | 10-2017-0138672 A | 12/2017 |
| KR | 10-2022-0042894 A | 4/2022 |
| KR | 10-2385206 B1 | 4/2022 |
| KR | 10-2022-0068098 A | 5/2022 |

\* cited by examiner

CAMERA MODULE

CROSS-REFERENCE TO RELATED APPLICATIONS

This application claims the benefit under 35 USC 119 (a) of Korean Patent Application No. 10-2023-0057545 filed on May 3, 2023, in the Korean Intellectual Property Office, the entire disclosure of which is incorporated herein by reference for all purposes.

BACKGROUND

1. Field

The present disclosure relates to a camera module.

2. Description of Related Art

A camera module has become a basic feature in a portable electronic device such as a tablet PC, a laptop computer, and a smartphone. In addition, the camera module may be provided with various functions such as an autofocus adjusting function (autofocusing, AF), an image stabilization function (optical image stabilization, OIS), and a zoom function (zoom).

For example, the autofocus adjusting function (AF) of the camera module may be implemented by moving a lens module in an optical axis direction. The camera module may include a voice-coil motor (VCM) actuator including a magnet and a coil generating a driving force for moving the lens module. In addition, the camera module may be provided with a plurality of ball members supporting the movement of the lens module.

Focus adjustment performance of the camera module may be improved by moving the lens module parallel to the optical axis direction as much as possible without tilting. However, in a structure in which the movement of the lens module may be supported by the plurality of ball members, the tilt may occur during the movement, which may negatively affect the focus adjustment performance of the camera module. In addition, there is a problem that other functions of the camera module may also be affected.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing having an internal space; a carrier disposed in the internal space; a lens module disposed in the carrier; a guide frame disposed between the carrier and the lens module; a first ball member and a second ball member disposed between the housing and the carrier, spaced apart from each other in a diagonal direction of the housing and the carrier, and configured to guide a movement of the carrier relative to the housing in a direction of an optical axis of the camera module; and a third ball member disposed between the carrier and the guide frame, and a fourth ball member disposed between the guide frame and the lens module, the third ball member and the fourth ball member being configured to guide a movement of the lens module in a direction perpendicular to the optical axis direction, wherein the third ball member and the fourth ball member do not overlap each other in the optical axis direction.

The carrier and the guide frame may include a third guide groove portion in which the third ball member is disposed, the third guide groove portion being formed in surfaces of the carrier and the guide frame facing each other in the optical axis direction, the guide frame and the lens module may include a fourth guide groove portion in which the fourth ball member is disposed, the fourth guide groove portion being formed in surfaces of the guide frame and the lens module facing each other in the optical axis direction, and the third guide groove portion and the fourth guide groove portion may not overlap each other when viewed in the optical axis direction.

The third guide groove portion may extend in a first axis direction perpendicular to the optical axis direction, and the fourth guide groove portion may extend in a second axis direction perpendicular to the optical axis direction and the first axis direction.

The fourth guide groove portion may be disposed closer to the optical axis in the first axis direction than the third guide groove portion on a plane perpendicular to the optical axis direction.

The lens module may include a second magnet spaced apart from the optical axis in the first axis direction; and a third magnet spaced apart from the optical axis in the second axis direction, the fourth guide groove portion may include two grooves adjacent to the second magnet, and the second magnet may be disposed outside the two guide grooves of the fourth guide groove portion that are adjacent to the second magnet.

The lens module may further include a lens holder on which the second magnet and the third magnet are disposed, and the lens holder may have a quadrilateral shape that is longer in the second axis direction than in the first axis direction.

The third guide groove portion and the fourth guide groove portion each may include four grooves respectively formed in four corner portions of the guide frame, and the third guide groove portion and the fourth guide groove portion may not overlap each other when viewed in a first axis direction perpendicular to the optical axis direction.

A portion of the third guide groove portion and a portion of the fourth guide groove portion may overlap each other when viewed in a second axis direction perpendicular to the optical axis direction and the first axis direction.

A center of a first quadrilateral region connecting centers of the four grooves of the third guide groove portion does not coincide with a center of a second quadrilateral region connecting centers of the four grooves of the fourth guide groove portion.

The camera module may further include a first magnet disposed on one side surface of the carrier and configured to generate a driving force for moving the carrier in the optical axis direction, wherein the first ball member may be spaced apart from the first magnet in a longitudinal direction of the first magnet.

The second ball member may be disposed on a corner portion of the guide frame, and the guide frame may include a first clearance portion having a chamfer shape formed in a corner portion of the guide frame facing the corner portion of the carrier on which the second ball member is disposed.

The lens module may include a lens holder facing the guide frame in the optical axis direction with the fourth ball member being disposed between the lens module and the guide frame, and the lens holder may include a second clearance portion having a chamfer shape formed in a corner portion of the lens holder facing the corner portion of the carrier on which the second ball member is disposed.

The camera module may further include a stopper disposed above the lens module, wherein the stopper may include a third clearance portion having a chamfer shape formed in the stopper at a position corresponding to the second clearance portion.

In another general aspect, a camera module includes a housing having an internal space; a carrier disposed in the internal space of the housing; a first ball member and a second ball member disposed between the housing and the carrier and spaced apart from each other in a diagonal direction of the housing and the carrier; a guide frame disposed above the carrier; a third ball member disposed between the guide frame and the carrier; a lens holder disposed above the guide frame; a fourth ball member disposed between the lens holder and the guide frame; and two magnets respectively disposed on two side surfaces of the lens holder perpendicular to each other, wherein a distance from an optical axis of the camera module to one of the two magnets is greater than a distance from the optical axis to another one of the two magnets.

The carrier may include openings in side surfaces of the carrier corresponding to the two side surfaces of the lens holder on which the two magnets are disposed, and when viewed in a direction of the optical axis, the two magnets may be disposed in the openings.

The camera module may further include a stopper disposed above the lens holder, wherein the stopper may include a first portion and a second portion extending above the openings to respectively cover the two magnets.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
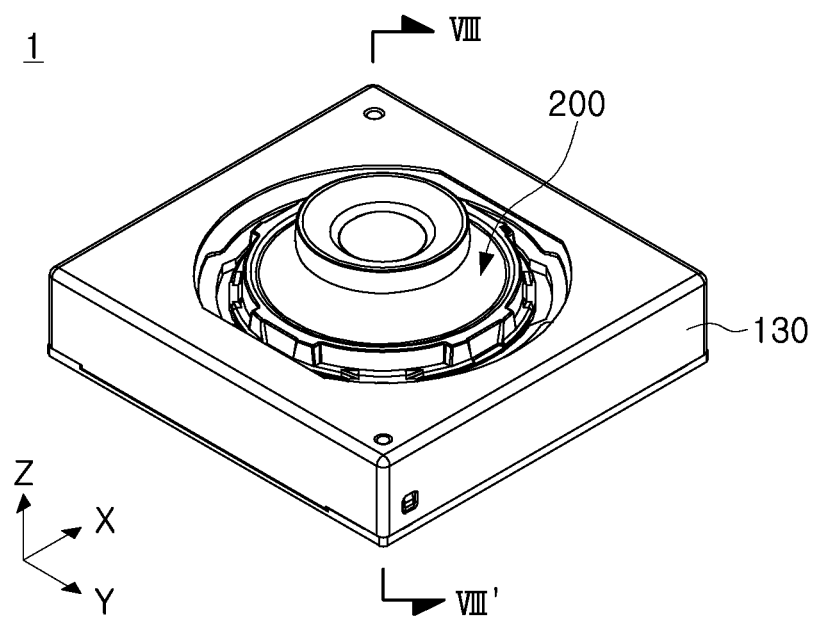
FIG. 1 is a perspective view of a camera module according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Further, in the present specification, an optical axis direction may mean a direction extending vertically along an optical axis of a lens module, or a direction parallel to the optical axis, a first axis direction may mean a direction perpendicular to the optical axis direction, and a second axis direction may mean a direction perpendicular to both the optical axis direction and the first axis direction.

The present disclosure relates to a camera module mounted on a portable electronic device. According to an embodiment, the portable electronic device may be a smartphone, a mobile communication terminal, a tablet PC, or a laptop computer.

Figure 2:
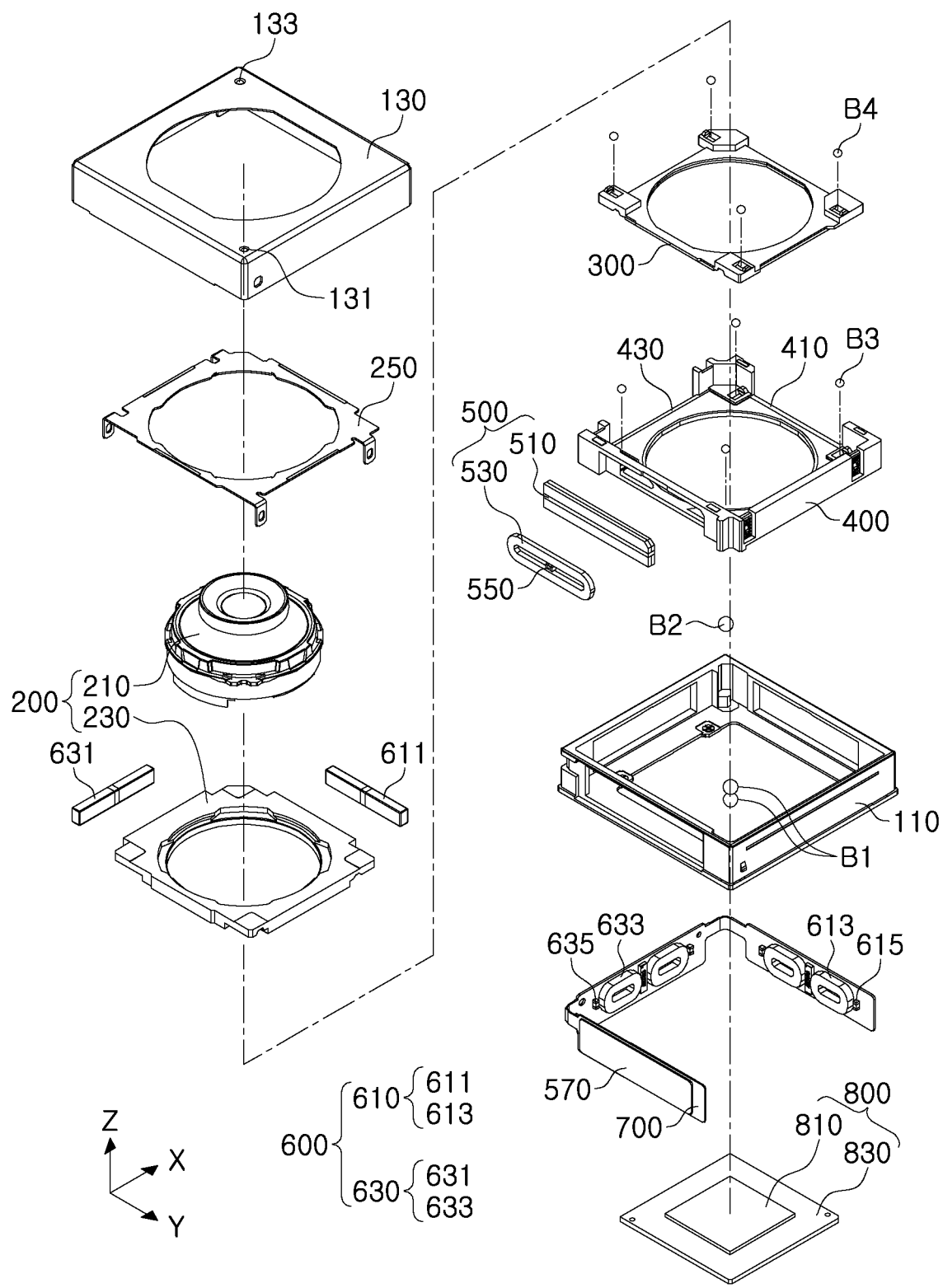
FIG. 2 is a schematic exploded perspective view of the camera module of FIG. 1.

FIG. 1 is a perspective view of a camera module according to an embodiment of the present disclosure, and FIG. 2 is a schematic exploded perspective view of the camera module of FIG. 1.

Figure 3:
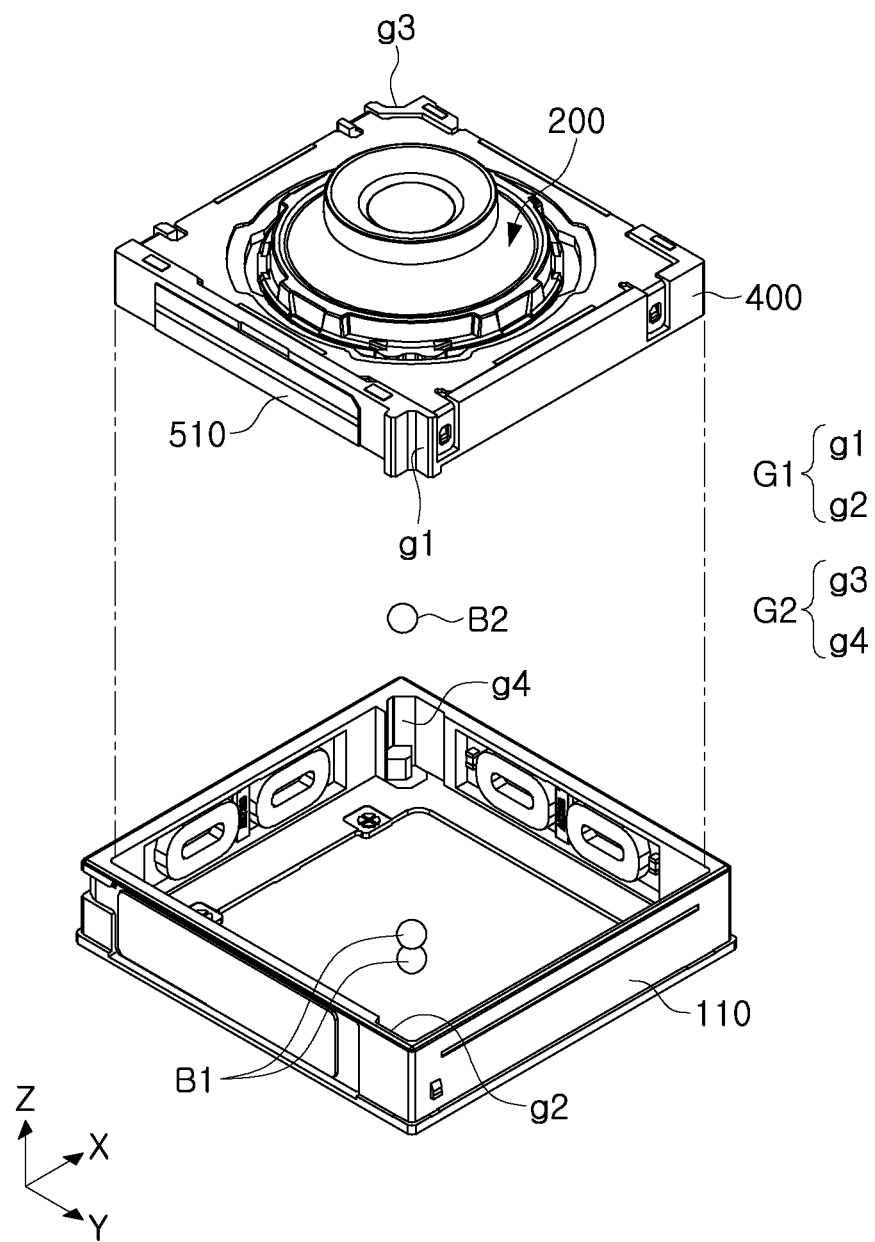
FIG. 3 is a perspective view illustrating a state in which a lens module and a carrier of FIG. 2 are separated from a housing of FIG. 2.
Figure 4:
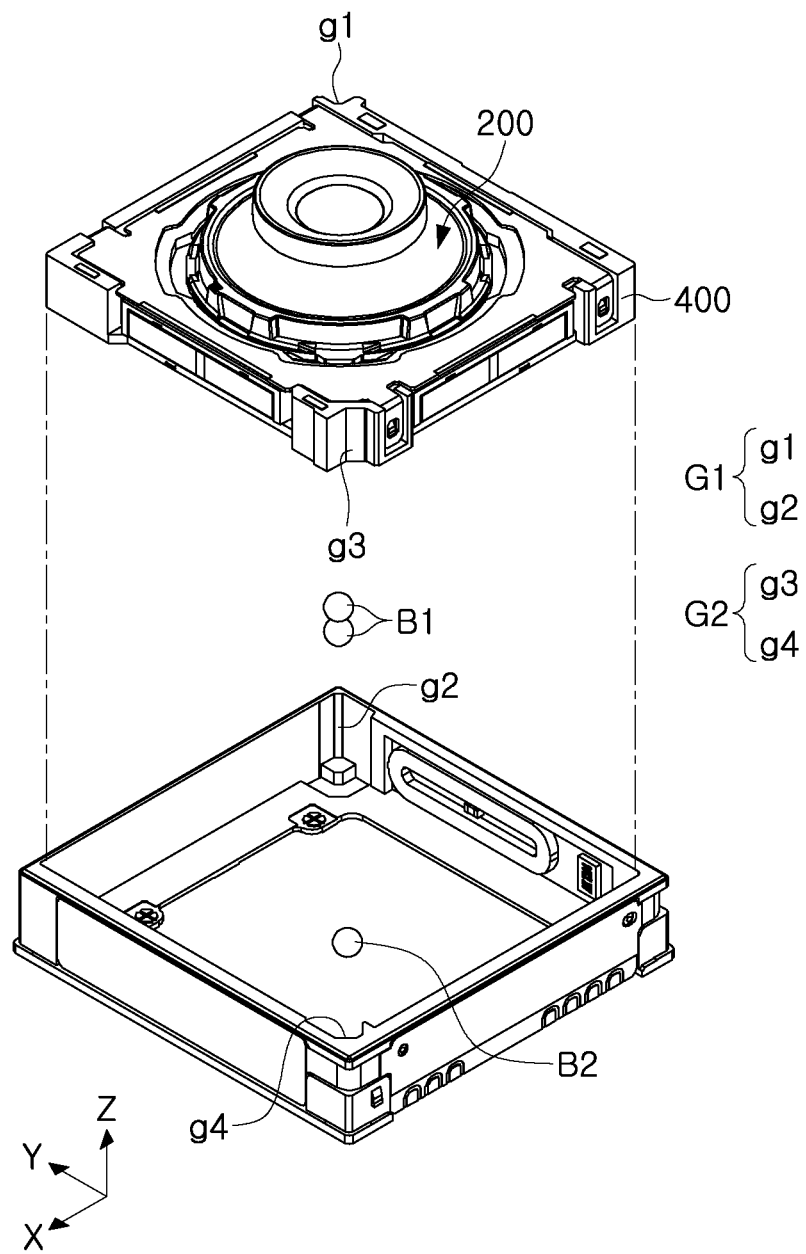
FIG. 4 is a perspective view of FIG. 3 viewed in a different direction.

FIG. 3 is a perspective view illustrating a state in which a lens module and a carrier of FIG. 2 are separated from a housing of FIG. 2, and FIG. 4 is a perspective view of FIG. 3 viewed in a different direction.

Referring to FIGS. 1 to 4, a camera module 1 according to an embodiment of the present disclosure may include a lens module 200, a guide frame 300, a carrier 400, a first driver 500, a second driver 600, and an image sensor module 800, and a housing 110 and a case 130 in which the above components are accommodated and disposed.

The lens module 200 may include at least one lens and a lens barrel 210 in which the at least one lens is mounted. When the lens module 200 includes a plurality of lenses, the plurality of lenses may be mounted in the lens barrel 210 in an optical axis (Z-axis) direction.

The lens module 200 may further include a lens holder 230 coupled to the lens barrel 210.

According to an embodiment of the present disclosure, the lens module 200 may be a moving member that moves in the optical axis (Z-axis) direction during autofocus adjustment (AF). In addition, the lens module 200 may be a moving member that moves in a directions (X-axis and Y-axis directions) perpendicular to an optical axis (Z-axis) during shake correction (OIS).

The carrier 400 may be disposed in the housing 110, and may accommodate the lens module 200. The carrier 400 may move in the optical axis (Z-axis) direction relative to the housing 110 during autofocus adjustment (AF), and the lens module 200 accommodated in the carrier 400 may move together with the carrier 400 in the optical axis (Z-axis) direction. Therefore, a distance between the lens module 200 and an image sensor 810 of the image sensor module 800 fixedly disposed on the housing 110 in the optical axis (Z-axis) direction may be changed to adjust a focus.

The housing 110 may have an internal space, and may have a hexahedral box shape having top and bottom surfaces having openings in the optical axis (Z-axis) direction. The case 130 may be coupled to the housing 110 to protect internal components accommodated and disposed in the housing 110.

A first protrusion 131 and a second protrusion 133 respectively protruding toward a first ball member B1 and a second ball member B2, which will be described later, may be provided on one surface of the case 130 facing the internal space of the housing 110. The first protrusion 131 and the second protrusion 133 may serve as a stopper and a buffer member for regulating movement ranges of the first ball member B1 and the second ball member B2.

A stopper 250 may be disposed between the case 130 and the lens module 200 in the optical axis (Z-axis) direction. The stopper 250 may be coupled to the carrier 400 to cover an upper surface of the lens module 200. For example, the stopper 250 may cover at least a portion of an upper surface of the lens holder 230. The stopper 250 may prevent the lens module 200 and/or the guide frame 300 from being separated from the carrier 400 when an external shock or other disturbance is applied to the camera module 1.

The image sensor module 800 may be disposed on a bottom surface of the housing 110. The image sensor module 800 may be fixedly disposed on the housing 110.

The image sensor module 800 may include an image sensor 810 having an imaging surface, and a printed circuit board 830 on which the image sensor 810 is disposed. For example, the image sensor 810 may be electrically connected to the printed circuit board 830 by wire bonding.

In addition, the image sensor module 800 may further include an infrared cut-off filter (not illustrated) disposed between the lens module 200 and the image sensor 810. The infrared cut-off filter may serve to block light in an infrared region in light incident through the lens module 200.

The imaging surface of the image sensor 810 may be disposed facing the optical axis (Z-axis) direction. The image sensor 810 may convert the light incident through the lens module 200 into an electrical signal. For example, the image sensor 810 may be a charge-coupled device (CCD) or a complementary metal-oxide-semiconductor (CMOS) device. The electrical signal converted by the image sensor 810 may be output as an image through a display unit of a portable electronic device in which the camera module 1 is mounted.

The first driver 500 may be a focus adjustment actuator, and may generate a driving force for moving the carrier 400 in the optical axis (Z-axis) direction.

The first driver 500 may include a first magnet 510 and a first coil 530. The first magnet 510 and the first coil 530 may be disposed facing each other in a direction perpendicular to the optical axis (Z-axis).

The first magnet 510 may be disposed on one side surface of the carrier 400. In addition, a back yoke (not illustrated) may be disposed between the first magnet 510 and the carrier 400. The back yoke may prevent leakage of magnetic flux of the first magnet 510.

The first magnet 510 may be magnetized so that one surface facing the first coil 530 has both an N pole and an S pole. For example, an N pole, a neutral region, and an S pole may be sequentially provided on the one surface of the first magnet 510 facing the first coil 530 in the optical axis (Z-axis) direction. The other surface of the first magnet 510 (a surface opposite to the one surface) may be magnetized to have both an S pole and an N pole. For example, an S pole, a neutral region, and an N pole may be sequentially provided on the other surface of the first magnet 510 in the optical axis (Z-axis) direction so that the S pole on the other surface opposes the N pole on the one surface, the neutral region on the other surface opposes the neutral region on the one surface, and the N pole on the other surface opposes the S pole on the one surface.

The first coil 530 may be disposed facing the first magnet 510 in a direction perpendicular to the optical axis (Z-axis). The first coil 530 may be disposed on one side surface of the housing 110 facing the first magnet 510 in the direction perpendicular to the optical axis (Z-axis) while being mounted on a substrate 700.

According to an embodiment of the present disclosure, the first magnet 510 may be a moving member disposed on the carrier 400 and moving in the optical axis (Z-axis) direction together with the carrier 400, and the first coil 530 may be a fixed member fixedly disposed on the housing 110 through the substrate 700.

When power is applied to the first coil 530, the carrier 400 may move in the optical axis (Z-axis) direction in response to an electromagnetic force generated between the first magnet 510 and the first coil 530. Since the lens module 200 may be accommodated in the carrier 400, the lens module 200 may also move in the optical axis (Z-axis) direction by the movement of the carrier 400 in the optical axis (Z-axis) direction.

The first ball member B1 and the second ball member B2 may be disposed between the carrier 400 and the housing 110 and may roll in the optical axis (Z-axis) direction when the carrier 400 moves relative to the housing 110 in the optical axis (Z-axis) direction. The first ball member B1 and the second ball member B2 may be spaced apart from each other in a direction perpendicular to the optical axis (Z-axis).

The first ball member B1 and the second ball member B2 may each include at least one ball. In addition, the first ball member B1 and the second ball member B2 may include different numbers of balls. For example, the first ball member B1 may include two or more balls disposed in the optical axis (Z-axis) direction, and the second ball member B2 may include a smaller number of balls than the first ball member B1.

A first yoke 570 may be disposed in the housing 110. The first yoke 570 may be disposed on the housing 110 facing the first magnet 510 in a direction perpendicular to the optical axis (Z-axis). For example, the first coil 530 may be disposed on one surface of the substrate 700, and the first yoke 570 may be disposed on the other surface of the substrate 700 (e.g., a surface opposite to the one surface).

The first magnet 510 and the first yoke 570 may generate an attractive force therebetween. For example, the attractive force may act between the first magnet 510 and the first yoke 570 in a direction in which the first magnet 510 and the first yoke 570 each other, e.g., in a direction perpendicular to the optical axis (Z-axis). The first ball member B1 and the second ball member B2 may be kept in contact with the carrier 400 and the housing 110 by the attractive force between the first magnet 510 and the first yoke 570.

The carrier 400 and the housing 110 may include guide grooves formed in surfaces of the carrier 400 and the housing 110 facing each other. For example, a first guide groove portion G1 may be formed in surfaces of the carrier 400 and the housing 110 facing each other, and a second guide groove portion G2 may be in two other surfaces of the carrier 400 and the housing 110 facing each other. The first ball member B1 may be disposed in the first guide groove portion G1, and the second ball member B2 may be disposed in the second guide groove portion G2.

According to an embodiment of the present disclosure, the first guide groove portion G1 and the second guide groove portion G2 may each extend in a direction parallel to the optical axis (Z-axis), and the first guide groove portion G1 and the second guide groove portion G2 may be spaced apart from each other in a direction perpendicular to the optical axis (Z-axis), for example, in a diagonal direction of the carrier 400 (a direction intersecting the X-axis and the Y-axis).

The first guide groove portion G1 may include a first guide groove g1 formed in the carrier 400, and a second guide groove g2 formed in the housing 110. The first guide groove g1 and the second guide groove g2 may each extend in a direction parallel to the optical axis (Z-axis).

The first guide groove g1 and the second guide groove g2 may be disposed facing each other in a direction perpendicular to the optical axis (Z-axis), and the first ball member B1 may be disposed in a space therebetween. Among the plurality of balls included in the first ball member B1, outermost balls in a direction parallel to the optical axis (Z-axis) may each be in contact with the first guide groove g1 at two points and the second guide groove g2 at two points.

Accordingly, among the plurality of balls included in the first ball member B1, outermost balls in a direction parallel to the optical axis (Z-axis) may be in contact with the first guide groove portion G1 at four points, Therefore, the first ball member B1 and the first guide groove portion G1 may function as a main guide for guiding movement of the carrier 400 in the optical axis (Z-axis) direction.

The second guide groove portion G2 may include a third guide groove g3 formed in the carrier 400, and a fourth guide groove g4 formed in the housing 110. The third guide groove g3 and the fourth guide groove g4 may each extend in a direction parallel to the optical axis (Z-axis).

The third guide groove g3 and the fourth guide groove g4 may be disposed facing each other in a direction perpendicular to the optical axis (Z-axis), and the second ball member B2 may be disposed in a space therebetween. At least one ball included in the second ball member B2 may be in contact with the third guide groove g3 at two points and the fourth guide groove g4 at one point, or may be in contact with the third guide groove g3 at one point and the fourth guide groove g4 at two points. For example, when the second ball member B2 includes one ball, the one ball included in the second ball member B2 may be in contact with the third guide groove g3 at two points and the fourth guide groove g4 at one point, or may be in contact with the third guide groove g3 at one point and the fourth guide groove g2 at two points.

Accordingly, at least one ball included in the second ball member B2 may be in contact with the second guide groove portion G2 at three points. Therefore, the second ball member B2 and the second guide groove portion G2 may function as an auxiliary guide supporting movement of the carrier 400 in the optical axis (Z-axis) direction.

As described above, the first ball member B1 and the second ball member B2 may be spaced apart in a direction perpendicular to the optical axis (Z-axis), and may include different numbers of balls. For example, the first ball member B1 may include two or more balls disposed in the optical axis (Z-axis) direction, and the second ball member B2 may include a smaller number of balls than the first ball member B1.

Referring to FIGS. 3 and 4, in an embodiment in which the first ball member B1 includes two balls and the second ball member B2 includes one ball, diameters of the two balls included in the first ball member B1 may be the same, and a diameter of the one ball included in the second ball member B2 may be equal to or different from the diameters of the two balls included in the first ball member B1.

Figure 5:
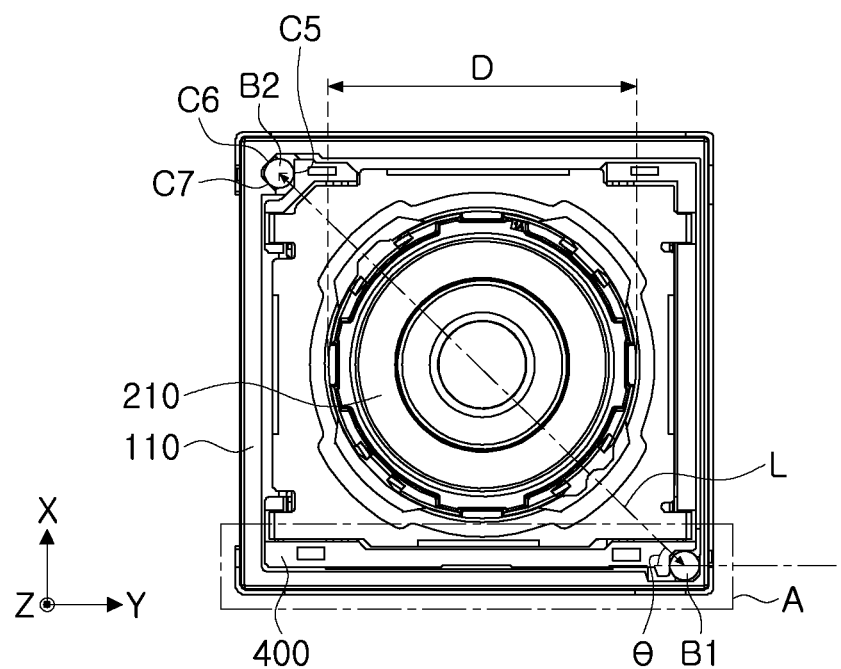
FIG. 5 is a plan view of a state in which a case is removed from a camera module according to an embodiment of the present disclosure.
Figure 6:
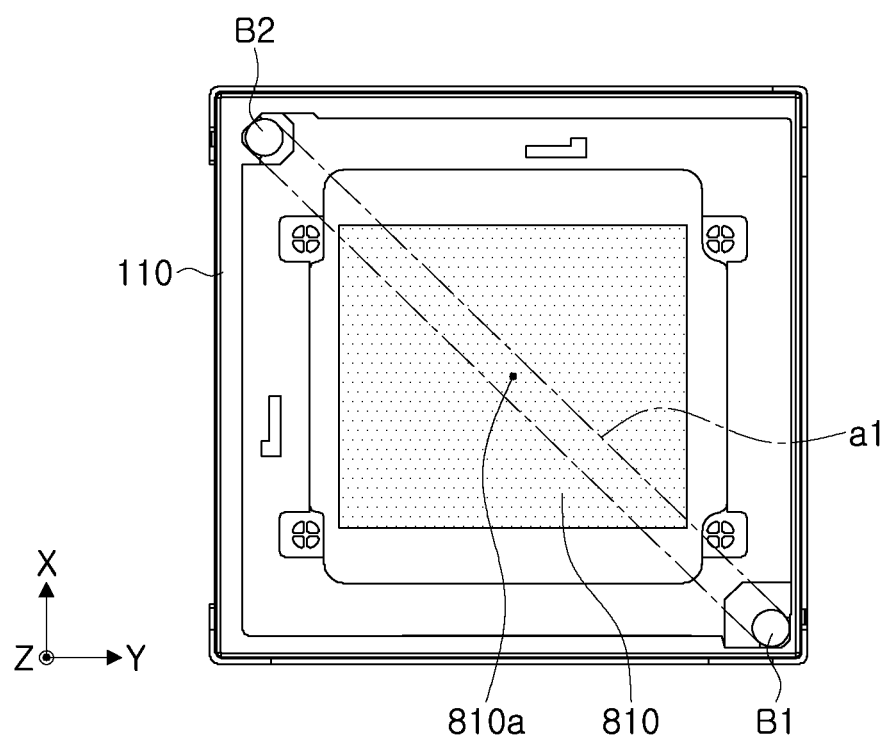
FIG. 6 is a plan view illustrating a positional relationship between a first ball member and a second ball member according to an embodiment of the present disclosure.

FIG. 5 is a plan view of a state in which a case is removed from a camera module according to an embodiment of the present disclosure, and FIG. 6 is a plan view illustrating a positional relationship between a first ball member and a second ball member according to an embodiment of the present disclosure.

Figure 7:
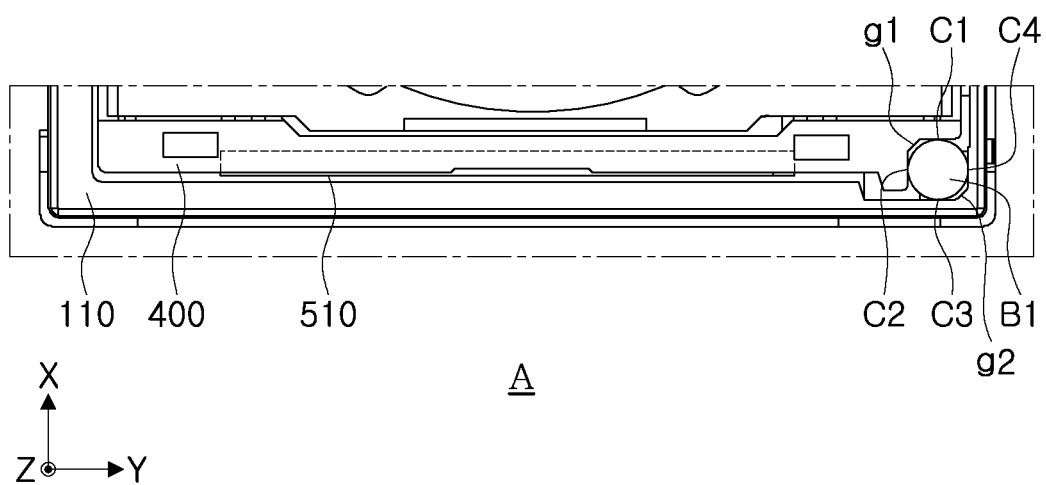
FIG. 7 is an enlarged view of a portion A of FIG. 5.
Figure 8:
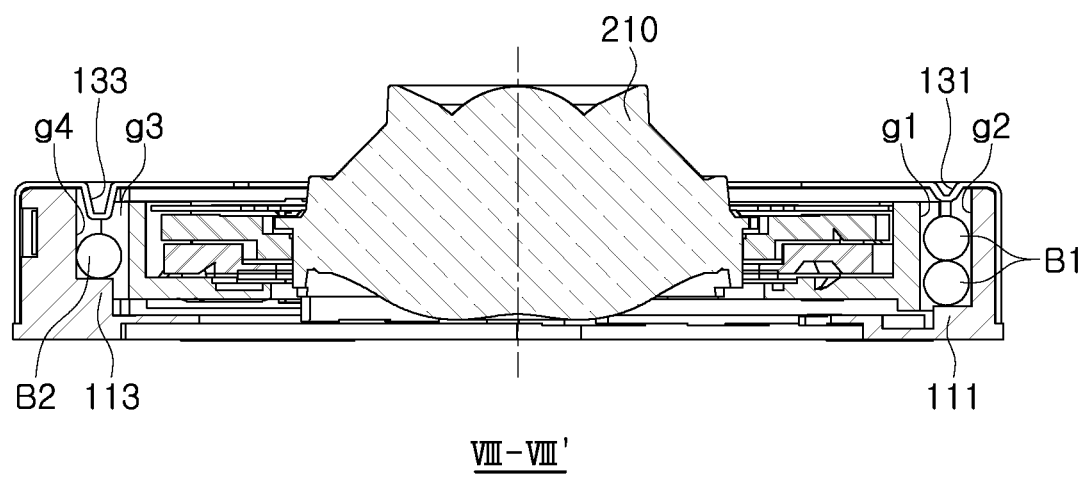
FIG. 8 is a cross-sectional view taken along the line VIII-VIII' in FIG. 1.

FIG. 7 is an enlarged view of a portion A of FIG. 5, and FIG. 8 is a cross-sectional view taken along the line VIII-VIII' in FIG. 1.

Referring to FIGS. 5 and 6, according to an embodiment of the present disclosure, a first ball member B1 and a second ball member B2 may be spaced apart from each other in a direction perpendicular to an optical axis (a Z-axis). For example, the first ball member B1 and the second ball member B2 may be spaced apart in a diagonal direction (a direction intersecting an X-axis and a Y-axis) of a carrier 400 (or a housing 110). Therefore, a distance between the first ball member B1 and the second ball member B2 may be greater than a length of one side of the carrier 400.

In an embodiment of the present disclosure, the first ball member B1 may be disposed relatively close to a first magnet 510, and the second ball member B2 may be disposed relatively far from the first magnet 510. For example, a virtual line extending in a longitudinal direction of the first magnet 510 on one surface of the first magnet 510 contacting the carrier 400 may pass through the first ball member B1, but may be spaced apart from the second ball member B2.

A general camera module may have a structure in which a first ball member and a second ball member are disposed on opposite sides of a first magnet in a longitudinal direction of the first magnet. According to this structure, a carrier may move in the optical axis (Z-axis) direction while the first ball member and the second ball member are pressed in the same direction by an attractive force between the first magnet and a first yoke. Since a center of the carrier may be spaced apart from a surface of the carrier supported by the first ball member and the second ball member, when the carrier moves in the optical axis (Z-axis) direction, the carrier may not move in a direction parallel to the optical axis (Z-axis), and tilt may occur.

In a camera module 1 according to an embodiment of the present disclosure, since a first ball member B1 may be disposed on one side of a first magnet 510 in a longitudinal direction of the first magnet 510, and a second ball member B2 may be disposed to be spaced apart from the first ball member B1 in a diagonal direction of a carrier 400, a rotational force about the first ball member B1 acting as a rotational axis may be generated by the attractive force between the first magnet 510 and the first yoke 570.

According to an embodiment of the present disclosure, the second ball member B2 may be kept in contact with the carrier 400 and the housing 110 by the rotational force about the first ball member B1 acting as the rotational axis. Also, even when a rotational force is applied to the carrier 400, the carrier 400 may not rotate about the first ball member B1 and the second ball member B2, and may move in the optical axis (Z-axis) direction.

In a camera module 1 according to an embodiment of the present disclosure, since a center of the carrier 400 may be located in a region in which a portion supported by the first ball member B1 and a portion supported by the second ball member B2 are connected to each other (e.g., since the center of the carrier 400 is disposed in a region of the carrier supported by the first ball member B1 and the second ball member B2), the carrier 400 may be not tilted, and may move parallel to the optical axis (Z-axis). Therefore, a driving stability during focus adjustment may be improved.

Referring to FIG. 5, when viewed in the optical axis (Z-axis) direction, a virtual line connecting a center of the first ball member B1 and a center of the second ball member B2 may form an acute angle (θ) with respect to the one side surface of the carrier 400 on which the first magnet 510 is mounted.

In addition, when viewed in the optical axis (Z-axis) direction, a virtual line connecting the center of the first ball member B1 and the center of the second ball member B2 may pass through the lens module 200 (or at least one lens disposed in the lens barrel 210), and a length L of the virtual line may be greater than a maximum diameter D of the lens barrel 210.

In addition, when viewed in the optical axis (Z-axis) direction, a center of the carrier 400 and a center of the lens module 200 may be located in a region a1 connecting opposite sides of the first ball member B1 and opposite sides of the second ball member B2 to each other, and a center 810a of an image sensor 810 may also be located in the region a1.

According to an embodiment of the present disclosure, a direction in which the first guide groove g1 and the second guide groove g2 face each other may be different from a direction in which the third guide groove g3 and the fourth guide groove g4 face each other. For example, the first guide groove g1 and the second guide groove g2 may face each other in a diagonal direction (a direction intersecting the X-axis and Y-axis) of the carrier 400, and the third guide groove g3 and the fourth guide groove g4 may face each other in a direction perpendicular to the optical axis, for example, in a second axis direction (Y-axis direction).

Referring to FIG. 7, the first ball member B1 may contact the first guide groove g1 at a first contact point C1 and a second contact point C2, and may contact the second guide groove g2 at a third contact point C3 and a fourth contact point C4. The first contact point C1 and the third contact point C3 may face each other in a direction perpendicular to the optical axis (Z-axis), for example, in a first axis direction (X-axis direction), and the second contact point C2 and the fourth contact point C4 may face each other in a second axis direction (Y-axis direction perpendicular to both the optical axis (Z-axis direction) and the first axis direction (X-axis direction). For example, when viewed in the optical axis (Z-axis) direction, the first guide groove g1 may have a substantially '[' shape, and the second guide groove g2 may have a substantially ']' shape.

Referring to FIGS. 3 and 5, the second ball member B2 may contact the third guide groove g3 at a fifth contact point C5, and may contact the fourth guide groove g4 at a sixth contact point C6 and a seventh contact point C7. For example, when viewed in the optical axis (Z-axis) direction, the third guide groove g3 may have a substantially '|' shape, and the fourth guide groove g4 may have a substantially '<' shape.

A length of the first guide groove portion G1 in the optical axis (Z-axis) direction may be different from a length of the second guide groove portion G2 in the optical axis (Z-axis) direction. For example, referring to FIG. 8, a length of the second guide groove g2 formed in the housing 110 in the optical axis (Z-axis) direction may be greater than a length of the fourth guide groove g4 formed in the housing 110 in the optical axis (Z-axis) direction.

In detail, a first support protrusion 111 and a second support protrusion 113 respectively protruding toward the first ball member B1 and the second ball member B2 may be provided on a bottom surface of the housing 110. A length of the second support protrusion 113 in the optical axis (Z-axis) direction may be greater than a length of the first support protrusion 111 in the optical axis (Z-axis) direction. In addition, a first protrusion 131 and a second protrusion 133 respectively protruding toward the first ball member B1 and the second ball member B2 may be provided on a surface of the case 130 facing an internal space of the housing 110. A length of the second protrusion 133 in the optical axis (Z-axis) direction may be greater than a length of the first protrusion 131 in the optical axis (Z-axis) direction. Therefore, the length of the second guide groove g2 in the optical axis (Z-axis) direction may be greater than the length of the fourth guide groove g4 in the optical axis (Z-axis) direction.

The first driver 500 may include a first position sensor 550 that detects a position of the carrier 400 in the optical axis (Z-axis) direction. The first position sensor 550 may be disposed on the substrate 700 together with the first coil 530 facing the first magnet 510. For example, the first position sensor 550 may be a Hall sensor.

The second driver 600 may be a shake correction actuator that compensates for shake during photography, and may generate a driving force for moving the lens module 200 in directions (X-axis and Y-axis directions) perpendicular to the optical axis (Z-axis).

Referring to FIG. 2, the guide frame 300, together with the lens module 200, may be accommodated in the carrier 400. The lens module 200, the guide frame 300, and the carrier 400 may be disposed in the optical axis (Z-axis) direction, and the guide frame 300 may be disposed between the lens module 200 and the carrier 400. The guide frame 300 may have a quadrilateral plate shape having an opening in the optical axis (Z-axis) direction.

According to an embodiment of the present disclosure, the guide frame 300 and the lens module 200 may move in the first axis direction (X-axis direction) relative to the carrier 400 in response to a first driving force generated by the second driver 600. The lens module 200 may move in the second axis direction (Y-axis direction) relative to the guide frame 300 in response to a second driving force generated by the second driver 600.

The second driver 600 may include a first sub-driver 610 and a second sub-driver 630. The first sub-driver 610 may generate the first driving force in the first axis direction (X-axis direction), and the second sub-driver 630 may generate the second driving force in the second axis direction (Y-axis direction).

The first sub-driver 610 may include a second magnet 611 and a second coil 613. The second magnet 611 and the second coil 613 may face each other in a direction perpendicular to the optical axis (Z-axis), for example, in the first axis direction (X-axis direction).

The second magnet 611 may be disposed on the lens module 200. For example, the second magnet 611 may be disposed on one side surface of the lens holder 230.

The second coil 613 may be disposed facing the second magnet 611 in a direction perpendicular to the optical axis (Z-axis), for example, in the first axis direction (X-axis direction).

The second coil 613 may have a hollow donut shape. The second coil 613 may include two coils spaced apart from each other in the second axis direction (Y-axis direction), which may be a longitudinal direction of the second magnet 611, and may face one surface of the second magnet 611.

Magnetic polarities of different portions of the one surface of the second magnet 611 facing the two coils may be different from each other. For example, one of the two coils may face an N pole of the one surface of the second magnet 611, and the other one of the two coils may face an S pole of the one surface of the second magnet 611.

According to an embodiment of the present disclosure, the second magnet 611 may be a moving member disposed on the lens holder 230 and moving in the first and second axis directions (X-axis and Y-axis directions) together with the lens holder 230, and the second coil 613 may be a fixed member fixedly disposed on the housing 110 through the substrate 700.

When power is applied to the second coil 613, an electromagnetic force generated between the second magnet 611 and the second coil 613 may move the lens module 200 and the guide frame 300 in the first axis (X-axis) direction. For example, the second magnet 611 and the second coil 613 may generate a driving force in the first axis (X-axis direction) in which the second magnet 611 and the second coil 613 face each other.

The second sub-driver 630 may include a third magnet 631 and a third coil 633. The third magnet 631 and the third coil 633 may face each other in a direction perpendicular to the optical axis (Z-axis), for example, in the second axis direction (Y-axis direction).

The third magnet 631 may be disposed on the lens module 200. For example, the third magnet 631 may be disposed on another side surface of the lens holder 230, i.e., a side surface of the lens holder 230 perpendicular to the one side surface of the lens holder 230 on which the second magnet 611 is disposed.

The third coil 633 may be disposed facing the third magnet 631 in a direction perpendicular to the optical axis (Z-axis), for example, in the second axis direction (Y-axis direction).

The third coil 633 may have a hollow donut shape. The third coil 633 may include two coils spaced apart from each other in the first axis direction (X-axis direction), which may be a longitudinal direction of the third magnet 631, and may face one surface of the third magnet 631.

Magnetic polarities of different portions of the one surface of the third magnet 631 facing the two coils may be different from each other. For example, one of the two coils may face an N pole of the one surface of the third magnet 631, and the other one of the two coils may face an S pole of the one surface of the third magnet 631.

According to an embodiment of the present disclosure, the third magnet 631 may be a moving member disposed on the lens holder 230 and moving in the first and second axis directions (X-axis and Y-axis directions) together with the lens holder 230, and the third coil 633 may be a fixed member fixedly disposed on the housing 110 through the substrate 700.

When power is applied to the third coil 633, an electromagnetic force generated between the third magnet 631 and the third coil 633 may move the lens module 200 in the second axis (Y-axis) direction. For example, the third magnet 631 and the third coil 633 may generate a driving force in the second axis direction (Y-axis direction) in which the third magnet 631 and the third coil 633 face each other.

The second coil 613 and the third coil 633 may be mounted on the substrate 700. For example, the second coil 613 may be mounted on the substrate 700 facing the second magnet 611, and the third coil 633 may be mounted on substrate 700 facing the third magnet 631.

The substrate 700 may be mounted on side surfaces of the housing 110. For example, at least a portion of two side surfaces of the housing 110 may include an opening, and the second coil 613 and the third coil 633 mounted on the substrate 700 may directly face the second magnet 611 and the third magnet 631 accommodated in the housing 110 through the openings.

The substrate 700 may surround three side surfaces of the housing 110. For example, the substrate 700 may be a flexible substrate, and may have a substantially 'C' shape when viewed in the optical axis (Z-axis) direction.

According to an embodiment of the present disclosure, the substrate 700 may surround the three side surfaces of the housing 110 without surrounding the first guide groove portion G1 to secure rigidity on a side of the first guide groove portion G1 corresponding to a main guide. For example, when the first ball member B1 is disposed at a corner of one side of the housing 110, and the second ball member B2 is disposed at a corner of another side of the housing 110 located in a diagonal direction from the corner of the one side, the substrate 700 may surround the three side surfaces of the housing 110 so that the corner of the one side of the housing 110 is not surrounded while the corner of the other side of the housing 110 is surrounded. Therefore, since there may be no loss of thickness of the housing 110 on a side of the first guide groove portion G1, rigidity of the side of the first guide groove portion G1 may be secured.

The first sub-driver 610 and the second sub-driver 630 may be disposed perpendicular to each other on a plane perpendicular to the optical axis (Z-axis). For example, the second magnet 611 and the third magnet 631 may be disposed perpendicular to each other on a plane perpendicular to the optical axis (Z-axis), and the second coil 613 and the third coil 633 may be disposed perpendicular to each other on the plane perpendicular to the optical axis (Z-axis).

The second magnet 611 and the third magnet 631 may be disposed closer to the second ball member B2 than to the first ball member B1. The second ball member B2 may be disposed in a corner portion of the carrier 400 corresponding to a corner portion of the lens holder 230 at which the one side surface of the lens holder 230 on which the second magnet 611 is disposed and the other side surface of the lens holder 230 on which the third magnet 631 is disposed meet.

From another point of view, a virtual line extending in a longitudinal direction of the second magnet 611 from a surface of the second magnet 611 contacting the lens holder 230 may pass through the second ball member B2, and may be spaced apart from the first ball member B1. Similarly, a virtual line extending in a longitudinal direction of the third magnet 631 from a surface of the third magnet 631 contacting the lens holder 230 may pass through the second ball member B2, and may be spaced apart from the first ball member B1.

Between the lens module 200 and the guide frame 300, and between the guide frame 300 and the carrier 400, a plurality of ball members that roll in the first axis direction (X-axis direction) or the second axis direction (Y-axis direction) may be disposed to enable the lens module 200 and the guide frame 300 to move relative to each other in directions (X-axis and Y-axis directions) perpendicular to the optical axis (Z-axis). The plurality of ball members may function to guide movement of the lens module 200 and/or movement of the guide frame 300 during shake correction, and may function to maintain a space between the lens module 200, the guide frame 300, and the carrier 400 in the optical axis (Z-axis) direction.

The plurality of ball members may include a third ball member B3 and a fourth ball member B4.

The third ball member B3 may guide movement of the lens module 200 and movement of the guide frame 300 in the first axis direction (X-axis direction), and the fourth ball member B4 may guide movement of the lens module 200 and movement of the guide frame 300 in the second axis direction (Y-axis direction).

The third ball member B3 may roll in the first axis direction (X-axis direction) in response to a driving force generated in the first axis direction (X-axis direction), and the fourth ball member B4 may roll in the second axis direction in response to a driving force generated in the second axis direction (Y-axis direction).

The third ball member B3 and the fourth ball member B4 may each include a plurality of balls. The third ball member B3 may include a plurality of balls disposed between the carrier 400 and the guide frame 300, and the fourth ball member B4 may include a plurality of balls disposed between the guide frame 300 and the lens module 200. For example, referring to FIG. 2, the third ball member B3 and the fourth ball member B4 may each include four balls.

The carrier 400 and the guide frame 300 may include a third guide groove portion G3 (see FIGS. 10 to 12) for accommodating the third ball member B3 formed in surfaces of the carrier 400 and the guide frame 300 facing each other in the optical axis (Z-axis) direction. The third guide groove portion G3 may include a plurality of guide grooves corresponding to the plurality of balls included in the third ball member B3. The guide grooves may have a quadrilateral shape having a length extending in the first axis direction (X-axis direction) as a whole. For example, referring to FIG. 2, the third guide groove portion G3 may include four guide grooves.

The third ball member B3 may be inserted between the carrier 400 and the guide frame 300 and accommodated in the third guide groove portion G3.

When the third ball member B3 is accommodated in the third guide groove portion G3, the third ball member B3 may move only in the first axis direction (X-axis direction), and cannot move in the optical axis (Z-axis) direction and the second axis direction (Y-axis direction). For example, the third ball member B3 may roll only in the first axis direction (X-axis direction).

The guide frame 300 and the lens module 200, in particular, the lens holder 230, may include a fourth guide groove portion G4 (see FIGS. 10 to 12) for accommodating the fourth ball member B4 formed in surfaces of the guide frame 300 and the lens module 200 facing each other in the optical axis (Z-axis) direction. The fourth guide groove portion G4 may include a plurality of guide grooves corresponding to the plurality of balls included in the fourth ball member B4. The guide grooves may have a quadrilateral shape having a length extending in the second axis direction (Y-axis direction) as a whole. For example, referring to FIG. 2, the fourth guide groove portion G4 may include four guide grooves.

The fourth ball member B4 may be inserted between the guide frame 300 and the lens holder 230 and accommodated in the fourth guide groove portion G4.

When the fourth ball member B4 is accommodated in the fourth guide groove portion G4, the fourth ball member B4 may move only in the second axis direction (Y-axis direction), and cannot move in the optical axis (Z-axis) direction and the first axis direction (X-axis direction). For example, the fourth ball member B4 may roll only in the second axis direction (Y-axis direction).

When a driving force is generated in the first axis direction (X-axis direction), the third ball member B3 disposed between the carrier 400 and the guide frame 300 may roll in the first axis direction (X-axis direction), and the guide frame 300 and the lens module 200 may move together in the first axis direction (X-axis direction) relative to the carrier 400. In this case, movement of the fourth ball member B4 is limited.

In addition, when a driving force is generated in the second axis direction (Y-axis direction), the fourth ball member B4 disposed between the guide frame 300 and the lens module 200 may roll in the second axis direction (Y-axis direction), and the lens module 200 may move in the second axis direction (Y-axis direction) relative to the guide frame 300. In this case, movement of the third ball member B3 is limited.

A second yoke 410 and a third yoke 430 may be disposed on the carrier 400 to prevent separation of the third and fourth ball members B3 and B4. The second yoke 410 and the third yoke 430 may be fixedly disposed on the carrier 400, and may respectively face the second magnet 611 and the third magnet 631 disposed on the lens holder 230 in the optical axis (Z-axis) direction.

The second yoke 410 and the third yoke 430 may be made of a material capable of generating an attractive force with the second magnet 611 and the third magnet 631 facing the second yoke 410 and the third yoke 430 in the optical axis (Z-axis) direction, for example, a magnetic material.

Therefore, attractive forces may be generated in the optical axis (Z-axis) direction between the second yoke 410 and the second magnet 611 and between the third yoke 430 and the third magnet 631, respectively, and the lens module 200 and the guide frame 300 may be pressed toward the carrier 400 by the attractive forces. In addition, by the attractive forces, the third ball member B3 may maintain contact with the carrier 400 and the guide frame 300, and the fourth ball member B4 may maintain contact with the guide frame 300 and the lens module 200.

The second driver 600 may include a second position sensor 615 and a third position sensor 635 that detect positions of the lens module 200 in first axis and second axis directions (X-axis and Y-axis directions) perpendicular to the optical axis (Z-axis) of the lens module 200. For example, the second position sensor 615 may detect a position of the lens module 200 in the second axis direction (Y-axis direction) perpendicular to the first axis direction (X-axis direction) of the driving force generated by the second magnet 611 and the second coil 613, and the third position sensor 635 may detect a position of the lens module 200 in the first axis direction (X-axis direction) perpendicular to the second axis direction (Y-axis direction) of the driving force generated by the third magnet 631 and the third coil 635. The second position sensor 615 may be disposed on the substrate 700 together with the second coil 613 facing the second magnet 611, and the third position sensor 635 may be disposed on the substrate 700 together with the third coil 633 facing the third magnet 631. For example, the second position sensor 615 and the third position sensor 635 may be Hall sensors.

Figure 9:
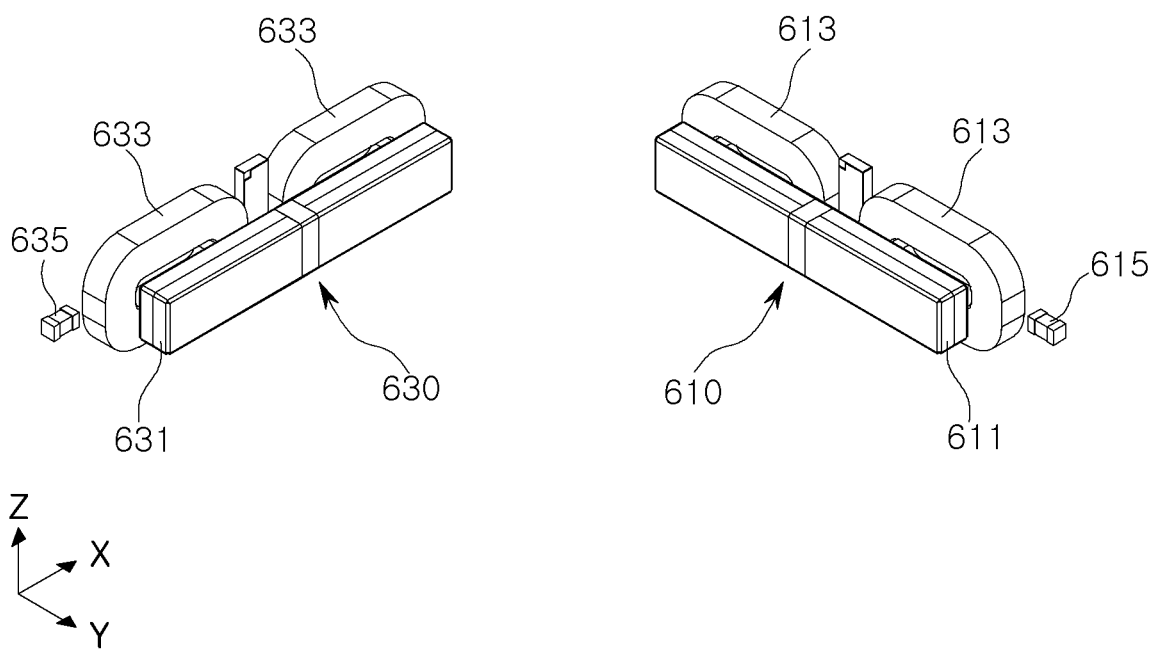
FIG. 9 is a view illustrating a second driver according to another embodiment of the present disclosure.

FIG. 9 is a view illustrating a second driver according to another embodiment of the present disclosure.

Referring to FIG. 9, a second magnet 611 and a third magnet 631 may be magnets polarized in a longitudinal direction and a width direction, respectively. A first sub-driver 610 may generate a driving force in the second axis direction (Y-axis direction) perpendicular to the first axis direction (X-axis direction) in which the second magnet 611 and a second coil 613 face each other, and a second sub-driver 630 may generate a driving force in the first axis direction (X-axis direction) perpendicular to the second axis direction (Y-axis direction) in which the third magnet 631 and a third coil 633 face each other.

A second position sensor 615 and a third position sensor 635 may sense positions of a lens module 200 in a directions perpendicular to a directions of the driving forces generated by the first sub-driver 610 and the second sub-driver 630. The second position sensor 615 may sense the position of the lens module 200 in a direction parallel to a direction of the driving force generated by the second magnet 611 and the second coil 613, and the third position sensor 635 may sense the position of the lens module 200 in a direction parallel to a direction of the driving force generated by the third magnet 631 and the third coil 633. For example, the second position sensor 615 may sense a position of the lens module 200 in the second axis direction (Y-axis direction), and the third position sensor 635 may sense a position of the lens module 200 in the first axis direction (X-axis direction).

According to an embodiment of the present disclosure, a direction of a driving force generated by the first sub-driver 610 and a direction of a driving force generated by the second sub-driver 630 may be changed according to respective magnetization directions of the second magnet 611 and the third magnet 631.

Figure 10:
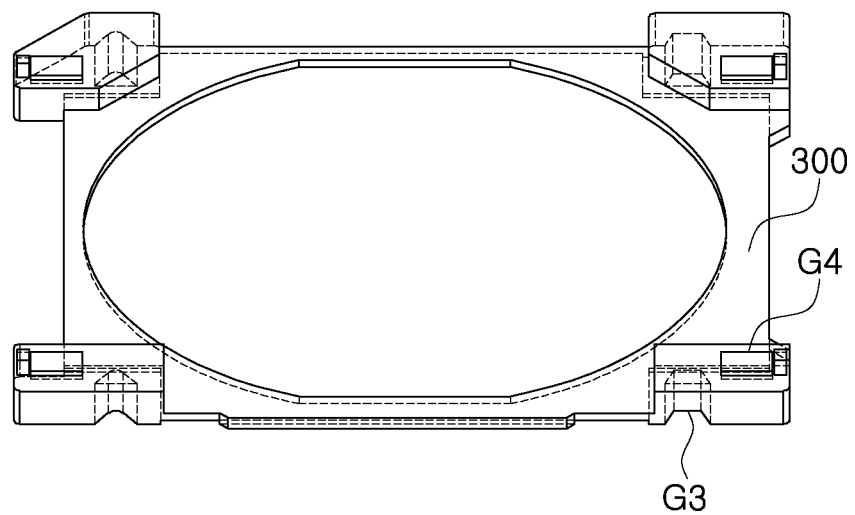
FIG. 10 is a perspective view of a guide frame according to an embodiment of the present disclosure.
Figure 11:
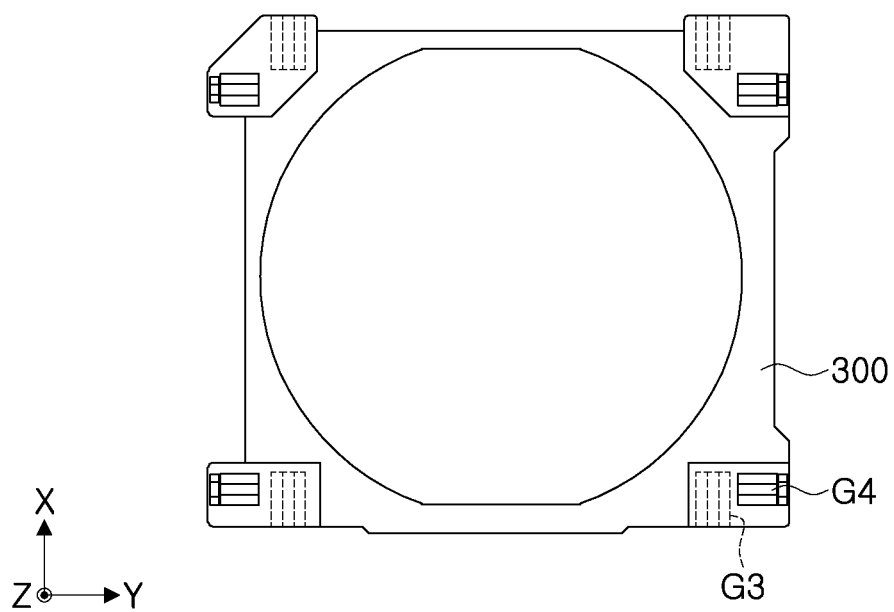
FIG. 11 is a plan view of the guide frame of FIG. 10.
Figure 12:
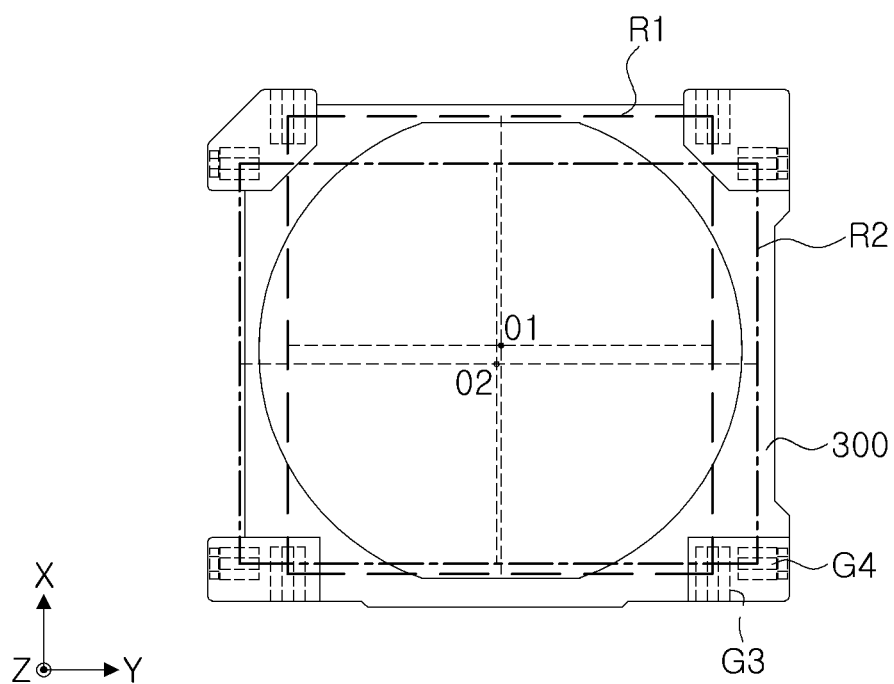
FIG. 12 is a plan view illustrating a positional relationship between a third guide groove portion and a fourth guide groove portion of the guide frame of FIG. 10 according to an embodiment of the present disclosure.

FIG. 10 is a perspective view of a guide frame according to an embodiment of the present disclosure, FIG. 11 is a plan view of the guide frame of FIG. 10, and FIG. 12 is a plan view illustrating a positional relationship between a third guide groove portion and a fourth guide groove portion of the guide frame of FIG. 10 according to an embodiment of the present disclosure.

Referring to FIG. 10, a third guide groove portion G3 in which a third ball member B3 is disposed may be formed in a lower surface of a guide frame 300 facing a carrier 400 in the optical axis (Z-axis) direction. In addition, a fourth guide groove portion G4 in which a fourth ball member B4 is disposed may be formed in an upper surface of the guide frame 300 facing a lens module 200 in the optical axis (Z-axis) direction.

When viewed in the optical axis (Z-axis) direction, the third guide groove portion G3 and the fourth guide groove portion G4 do not overlap each other. In detail, since the third ball member B3 and the fourth ball member B4 are disposed in the third guide groove portion G3 and the fourth guide groove portion G4, respectively, the third guide groove portion G3 and the fourth guide groove portion G4 should have predetermined depths to accommodate the third ball member B3 and the fourth ball member B4. Therefore, in a structure in which the third guide groove portion G3 and the fourth guide groove portion G4 overlap each other n the optical axis (Z-axis) direction, a thickness of the guide frame 300 in the optical axis (Z-axis) direction may inevitably increase, thereby causing a problem that a height of a camera module 1 of FIG. 1 in the optical axis (Z-axis) direction also increases.

According to an embodiment of the present disclosure, since the third guide groove portion G3 and the fourth guide groove portion G4 do not overlap each other in the optical axis (Z-axis) direction, the guide frame 300 may be relatively thin. Therefore, a height of the camera module 1 in the optical axis (Z-axis) direction may decrease compared to a structure in which the third guide groove portion G3 and the fourth guide groove portion G4 overlap each other in the optical axis (Z-axis) direction.

Referring to FIG. 11, the third guide groove portion G3 and the fourth guide groove portion G4 may be formed in four corner portions of the guide frame 300 so that each of the third guide groove portion G3 and the fourth guide groove portion G4 has four grooves. When viewed in the optical axis (Z-axis) and first axis (X-axis) directions, the third guide groove portion G3 and the fourth guide groove portion G4 do not overlap each other. Also, a portion of the third guide groove portion G3 and a portion of the fourth guide groove portion G4 may not overlap each other when viewed in the second axis direction (Y-axis direction), and a remaining portion of the third guide groove portion G3 and a remaining portion of the fourth guide groove portion G4 may overlap each other when viewed in the second axis direction (Y-axis direction). In addition, the fourth guide groove portion G4 may be formed closer to the optical axis (Z-axis) in the first axis direction (X-axis direction) than the third guide groove portion G3.

Since the third guide groove portion G3 and the fourth guide groove portion G4 may be formed in the four corner portions of the guide frame 300, quadrilateral regions may be formed by connecting centers of the four grooves of the third guide groove portion G3 and centers of the four grooves of the fourth guide groove portion G4. Hereinafter, a quadrilateral region formed by connecting the centers of the four grooves of the third guide groove portion G3 may be referred to as a first quadrilateral region R1, and a quadrilateral region formed by connecting the centers of the four grooves of the fourth guide groove portion G4 may be referred to as a second quadrilateral region R2.

The first quadrilateral region R1 and the second quadrilateral region R2 may each have a rectangular shape having a longer length in one direction. For example, the first quadrilateral region R1 may have a rectangular shape having a longer length in the first axis direction (X-axis direction) in which the four grooves of the third guide groove portion G3 extend, and the second quadrilateral region R2 may have a rectangular shape having a longer length in the second axis direction (Y-axis direction) in which the four grooves of the fourth guide groove portion G4 extend.

As described above, a portion of the third guide groove portion G3 and a portion of the fourth guide groove portion G4 may not overlap each other when viewed in the second axis direction (Y-axis direction), and a remaining portion of the third guide groove portion G3 and a remaining portion of the fourth guide groove portion G4 may overlap each other when viewed in the second axis direction (Y-axis direction). Therefore, the first quadrilateral region R1 and the second quadrilateral region R2 may overlap each other in an offset manner, and a center O1 of the first quadrilateral region R1 and a center O2 of the second quadrilateral region R2 may not coincide with each other.

Referring to FIG. 11, one of the four corners of the guide frame 300 may have a chamfer shape. Hereinafter, a corner of the guide frame 300 having a chamfer shape may be referred to as a first clearance portion 350 (see FIGS. 13-14).

According to an embodiment of the present disclosure, the first clearance portion 350 may be formed in a corner of the guide frame 300 facing a corner portion of the carrier 400 on which the second ball member B2 is disposed.

Figure 13:
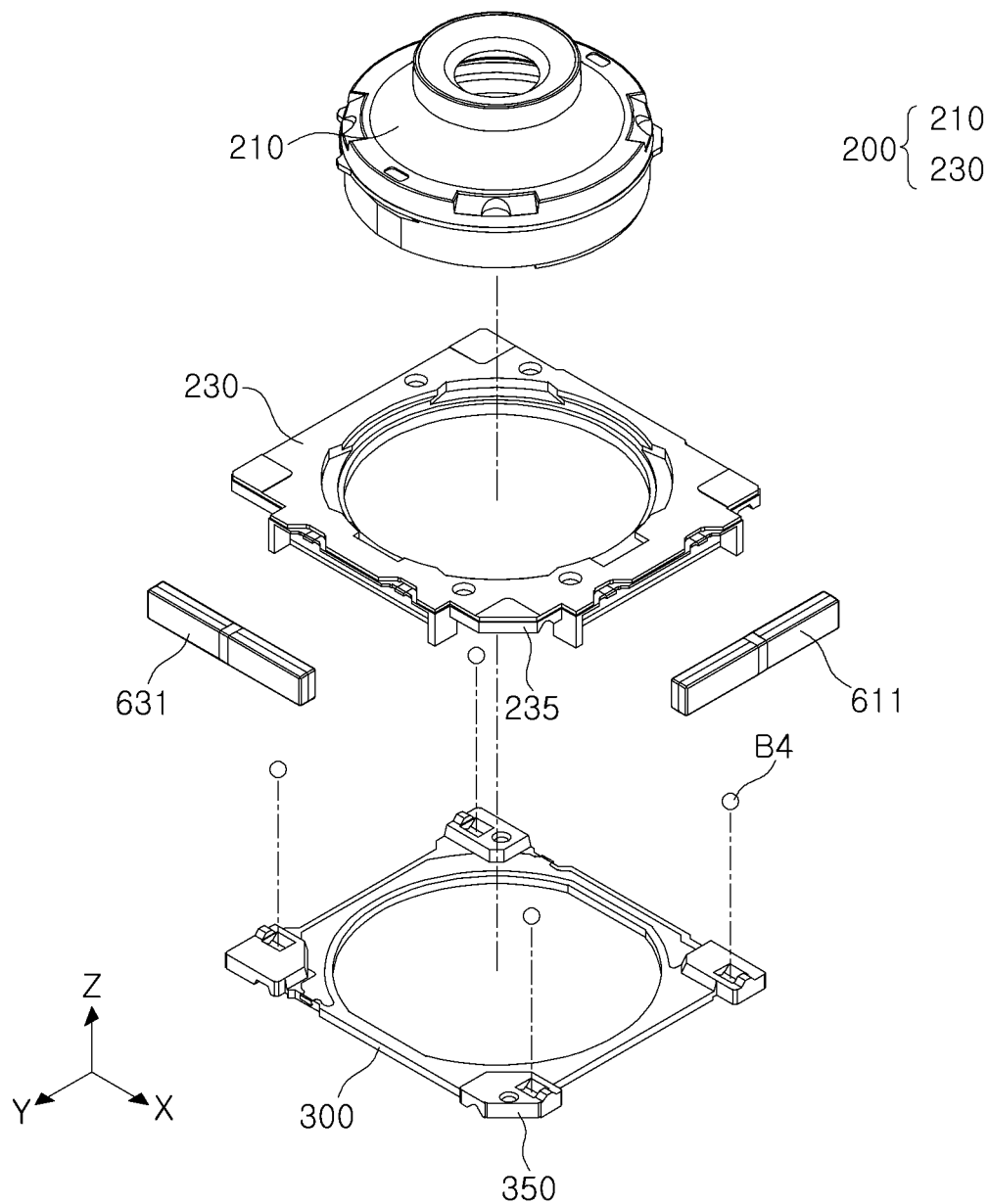
FIG. 13 is a perspective view illustrating a state in which a lens module and a guide frame are separated from a carrier according to an embodiment of the present disclosure.
Figure 14:
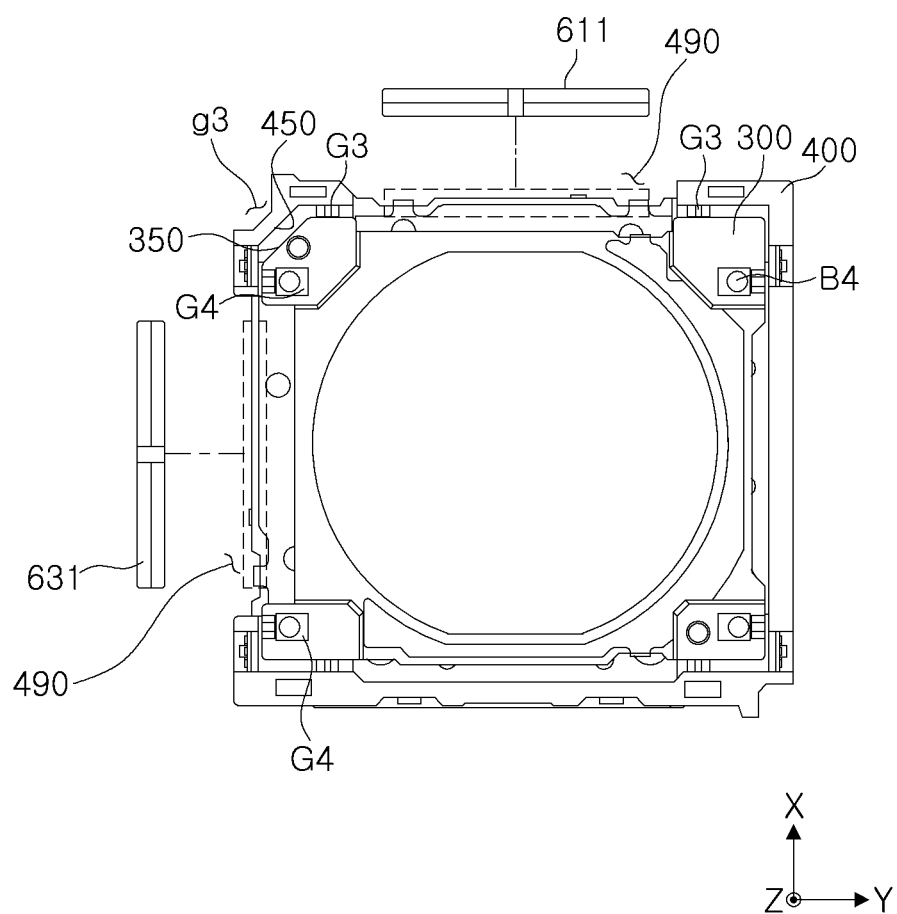
FIG. 14 is a plan view illustrating a state in which the guide frame of FIG. 13 is coupled to a carrier according to an embodiment of the present disclosure.
Figure 15:
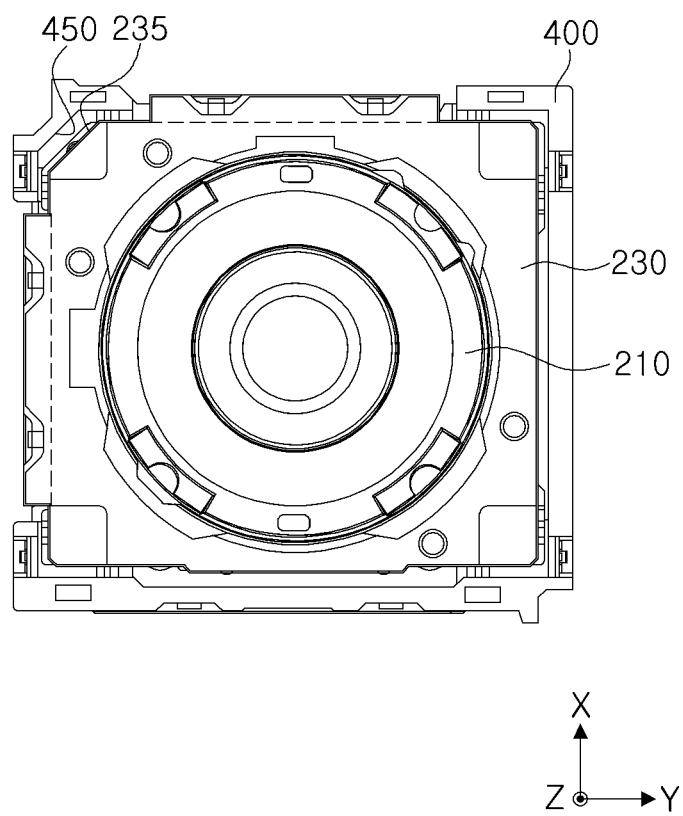
FIG. 15 is a plan view illustrating a state in which the lens module of FIG. 13 s coupled to the assembly of FIG. 14.
Figure 16:
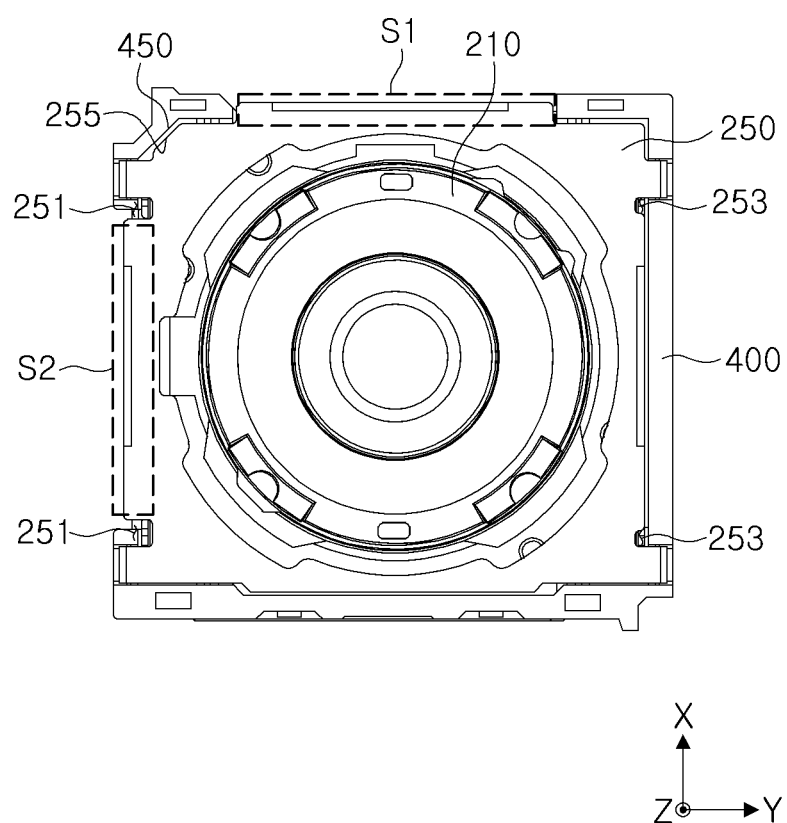
FIG. 16 is a plan view illustrating a state in which a stopper according to an embodiment of the present disclosure is coupled to the assembly of FIG. 15.

FIG. 13 is a perspective view illustrating a state in which a lens module and a guide frame are separated from a carrier according to an embodiment of the present disclosure, and FIG. 14 is a plan view illustrating a state in which the guide frame of FIG. 13 s coupled to a carrier according to an embodiment of the present disclosure. FIG. 15 is a plan view illustrating a state in which the lens module of FIG. 13 is coupled to the assembly of FIG. 14, and FIG. 16 is a plan view illustrating a state in which a stopper according to an embodiment of the present disclosure is coupled to the assembly of FIG. 15.

Any one corner among four corners of a guide frame 300 and any one corner among four corners of a lens module 200 may have a chamfer shape. For example, the guide frame 300 may include a first clearance portion 350 having a chamfer shape formed in a corner of the guide frame 300 facing a corner portion of a carrier 400 on which a second ball member B2 is disposed, and the lens module 200 may include a second clearance portion 235 formed in a position corresponding to the first clearance portion 350 of the guide frame 300. The second clearance portion 235 may be formed in a lens holder 230.

The first clearance portion 350 and the second clearance portion 235 may be formed where the second ball member B2 is disposed in a diagonal direction of the carrier 400 with respect to a first ball member B1. In the carrier 400, a third guide groove g3 of a second guide groove portion G2 in which the second ball member B2 is disposed may be formed, and a reinforcing portion 450 for securing a minimum thickness of the third guide groove g3 may be formed on an internal side surface of the carrier 400 on which the lens module 200 is accommodated. In an embodiment, the reinforcing portion 450 may have a chamfer shape.

The guide frame 300 and the lens module 200 may be accommodated in the carrier 400 so that the first clearance portion 350 and the second clearance portion 235 face the reinforcing portion 450 of the carrier 400. For example, the first clearance portion 350 and the second clearance portion 235 may face each other in a direction perpendicular to the reinforcing portion 450 and an optical axis (Z-axis).

Any one corner among four corners of a stopper 250 disposed above the lens module 200 may also have a chamfer shape. For example, the stopper 250 may include a third clearance portion 255 having a chamfer shape at a position corresponding to the second clearance portion 350 of the lens module 200. In a state in which the stopper 250 is coupled to the carrier 400 to cover the lens module 200, the third clearance portion 255 may face the reinforcing portion 450 in a direction perpendicular to the optical axis (Z-axis). The stopper 250 is also shown in FIG. 2, and can also be seen in FIGS. 3 and 4, although it is not identified by a reference number in these figures.

According to an embodiment of the present disclosure, a second magnet 611 and a third magnet 631 may be disposed on side surfaces of the lens holder 230, and a distance of the second magnet 611 from the optical axis (Z-axis) and a distance of the third magnet 631 from the optical axis (Z-axis) may be different from each other.

For example, either the second magnet 611 or the third magnet 631 may be disposed outside a ball member that guides movement of the lens module 200 in the first axis direction (X-axis direction) or the second axis direction (Y-axis direction) perpendicular to the optical axis (Z-axis). Referring to FIG. 14, the second magnet 611 may be disposed outside a fourth guide groove portion G4, and the third magnet 631 may be disposed between grooves of the fourth guide groove portion G4.

Referring to FIG. 15, the lens holder 230 may have a rectangular shape having a longer length in the second axis (Y-axis) direction than in the first axis (X-axis) direction. The second magnet 611 and the third magnet 631 may be located on side surfaces of the lens holder 230 spaced apart from the optical axis (Z-axis) in the first axis direction (X-axis direction) and second axis (Y-axis direction), respectively. According to an embodiment of the present disclosure, a distance from the optical axis (Z-axis) to the third magnet 631 may be greater than a distance from the optical axis (Z-axis) to the second magnet 611. Therefore, when viewed in the optical axis (Z-axis) direction, the lens holder 230 may have a rectangular shape having a longer length in the second axis (Y-axis) direction than in the first axis (X-axis) direction.

The lens holder 230 may have the rectangular shape having the longer length in the second axis (Y-axis) direction than in the first axis (X-axis) direction to secure a driving margin of the lens module 200 in the second axis (Y-axis) direction.

According to an embodiment of the present disclosure, the second magnet 611 and the third magnet 631 may be arranged farther away from the optical axis (Z-axis) in first axis and second axis directions (X-axis and Y-axis directions), respectively, perpendicular to the optical axis (Z-axis) compared to a conventional structure. Therefore, the carrier 400 may include openings 490 in side surfaces of the carrier 400 facing side surfaces of the lens holder 230 on which the second magnet 611 and the third magnet 631 are disposed. Referring to FIG. 14, when viewed in the optical axis (Z-axis) direction, the second magnet 611 and the third magnet 631 may be disposed in the openings 490 of the carrier 400.

Referring to FIG. 16, since the magnets 611 and 631 of a second driver 600 are disposed farther from the optical axis (Z-axis) compared to a conventional structure, an area of the stopper 250 may also be expanded. For example, since the stopper 250 needs to protect the second magnet 611 and the third magnet 631, the stopper 250 may include a first portion S1 and a second portion S2 extending to cover the openings 490 of the carrier 400 and the second magnet 611 and the third magnet 631, and thus an entire area of the stopper 250 may be expanded.

Since a size of the stopper 250 is increased by the first portion S1 and the second portion S2, a portion of the stopper 250 may overlap the carrier 400 when the stopper 250 is coupled to the carrier 400. Therefore, the stopper 250 may include a clearance portion avoiding the carrier 400.

Since the stopper 250 should protect the magnets 611 and 631 while avoiding the carrier 400, the stopper 250 may include a structure having a groove shape. For example, the stopper 250 may include first clearance grooves 251 corresponding to a shape of the carrier 400 on both sides of the second portion S2 extending to cover the third magnet 631. The first clearance grooves 251 may be spaced apart by approximately a length of the third magnet 631. The first clearance grooves 251 accommodate protruding portions of a sidewall of the carrier 400 as can best be seen in FIG. 4.

In addition, the stopper 250 may include third clearance grooves 253 on an opposite side of the stopper 250 from the second portion S2. The third clearance grooves 253 are formed on both sides of a cutout in the third stopper 250 accommodating a protruding portion of another sidewall of the carrier 400 as can best be seen in FIG. 3. The third clearance grooves 253 may face the first clearance grooves 251 in the second axis direction (Y-axis direction).

As described above, according to an embodiment of the present disclosure, in a camera module 1, ball members for guiding movement of a lens module 200 in the optical axis (Z-axis) direction may be disposed in a diagonal direction of a carrier to improve a stability of a focus adjustment.

In addition, a magnet for generating a driving force to drive a lens module 200 in a first axis and second axis directions (X-axis and Y-axis directions) perpendicular to an optical axis (Z-axis), and a ball member for guiding driving of the lens module 200 in a the first axis and second axis directions (X-axis and Y-axis directions) perpendicular to the optical axis (Z-axis), may be arranged to not overlap each other in the optical axis (Z-axis) direction to decrease a thickness of a camera module 1 in the optical axis (Z-axis) direction compared to the prior art.

A camera module according to an embodiment of the present disclosure may improve a focus adjustment performance. In addition, a camera module according to an embodiment of the present disclosure may be manufactured in a slimmer size.

While this disclosure includes specific examples, it will be apparent after an understanding of the disclosure of this application that various changes in form and details may be made in these examples without departing from the spirit and scope of the claims and their equivalents. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a housing having an internal space;
   a carrier disposed in the internal space;
   a lens module disposed in the carrier;
   a guide frame disposed between the carrier and the lens module;
   a first ball member and a second ball member disposed between the housing and the carrier, spaced apart from each other in a diagonal direction of the housing and the carrier, and configured to guide a movement of the carrier relative to the housing in a direction of an optical axis of the camera module; and
   a third ball member disposed between the carrier and the guide frame and comprising a plurality of balls, and a fourth ball member disposed between the guide frame and the lens module and comprising a plurality of balls, the third ball member and the fourth ball member being configured to guide a movement of the lens module in a direction perpendicular to the optical axis direction,
   wherein the carrier and the guide frame comprise a third guide groove portion in which all of the balls of the third ball member are disposed, the third quide groove portion being formed in surfaces of the carrier and the quide frame facing each other in the optical axis direction,
   the quide frame and the lens module comprise a fourth quide groove portion in which all of the balls of the fourth ball member are disposed, the fourth quide groove portion being formed in surfaces of the guide frame and the lens module facing each other in the optical axis direction, and no portion of the third quide groove portion overlaps any portion of the fourth quide groove portion in the optical axis direction.

2. The camera module of claim 1, wherein the third guide groove portion extends in a first axis direction perpendicular to the optical axis direction, and the fourth guide groove portion extends in a second axis direction perpendicular to the optical axis direction and the first axis direction.

3. The camera module of claim 2, wherein the lens module comprises:

a second magnet spaced apart from the optical axis in the first axis direction; and a third magnet spaced apart from the optical axis in the second axis direction, the fourth guide groove portion comprises two grooves adjacent to the second magnet, and the second magnet is disposed outside the two guide grooves of the fourth guide groove portion that are adjacent to the second magnet.

4. The camera module of claim 3, wherein the lens module further comprises a lens holder on which the second magnet and the third magnet are disposed, and the lens holder has a quadrilateral shape that is longer in the second axis direction than in the first axis direction.

5. The camera module of claim 1, wherein the third guide groove portion and the fourth guide groove portion each comprise four grooves respectively formed in four corner portions of the guide frame, and the third guide groove portion and the fourth guide groove portion do not overlap each other when viewed in a first axis direction perpendicular to the optical axis direction.

6. The camera module of claim 5, wherein a portion of the third guide groove portion and a portion of the fourth guide groove portion overlap each other when viewed in a second axis direction perpendicular to the optical axis direction and the first axis direction.

7. The camera module of claim 6, wherein a center of a first quadrilateral region connecting centers of the four grooves of the third guide groove portion does not coincide with a center of a second quadrilateral region connecting centers of the four grooves of the fourth guide groove portion.

8. The camera module of claim 1, further comprising a first magnet disposed on one side surface of the carrier and configured to generate a driving force for moving the carrier in the optical axis direction, wherein the first ball member is spaced apart from the first magnet in a longitudinal direction of the first magnet.

9. The camera module of claim 1, wherein the second ball member is disposed on a corner portion of the guide frame, and the guide frame comprises a first clearance portion having a chamfer shape formed in a corner portion of the guide frame facing the corner portion of the carrier on which the second ball member is disposed.

10. The camera module of claim 9, wherein the lens module comprises a lens holder facing the guide frame in the optical axis direction with the fourth ball member being disposed between the lens module and the guide frame, and the lens holder comprises a second clearance portion having a chamfer shape formed in a corner portion of the lens holder facing the corner portion of the carrier on which the second ball member is disposed.

11. The camera module of claim 10, further comprising a stopper disposed above the lens module, wherein the stopper comprises a third clearance portion having a chamfer shape formed in the stopper at a position corresponding to the second clearance portion.

12. A camera module comprising;

a housing having an internal space;

a carrier disposed in the internal space;

a lens module disposed in the carrier;

a guide frame disposed between the carrier and the lens module;

a first ball member and a second ball member disposed between the housing and the carrier, spaced apart from each other in a diagonal direction of the housing and the carrier, and configured to guide a movement of the carrier relative to the housing in a direction of an optical axis of the camera module; and a third ball member disposed between the carrier and the quide frame, and a fourth ball member disposed between the quide frame and the lens module, the third ball member and the fourth ball member being configured to guide a movement of the lens module in a direction perpendicular to the optical axis direction, wherein the third ball member and the fourth ball member do not overlap each other in the optical axis direction, and the carrier and the guide frame comprise a third quide groove portion in which the third ball member is disposed, the third guide groove portion being formed in surfaces of the carrier and the guide frame facing each other in the optical axis direction, the guide frame and the lens module comprise a fourth guide groove portion in which the fourth ball member is disposed, the fourth guide groove portion being formed in surfaces of the guide frame and the lens module facing each other in the optical axis direction, the third guide groove portion and the fourth guide groove portion do not overlap each other when viewed in the optical axis direction, the third guide groove portion extends in a first axis direction perpendicular to the optical axis direction, the fourth guide groove portion extends in a second axis direction perpendicular to the optical axis direction and the first axis direction, and the fourth guide groove portion is disposed closer to the optical axis in the first axis direction than the third guide groove portion on a plane perpendicular to the optical axis direction.

13. A camera module comprising:

a housing having an internal space;

a carrier disposed in the internal space of the housing;

a first ball member and a second ball member disposed between the housing and the carrier and spaced apart from each other in a diagonal direction of the housing and the carrier;

a guide frame disposed above the carrier;

a third ball member disposed between the guide frame and the carrier;

a lens holder disposed above the guide frame;

a fourth ball member disposed between the lens holder and the guide frame; and two magnets respectively disposed on two side surfaces of the lens holder perpendicular to each other, wherein a distance from an optical axis of the camera module to one of the two magnets is greater than a distance from the optical axis to another one of the two magnets.

14. The camera module of claim 13, wherein the carrier comprises openings in side surfaces of the carrier corresponding to the two side surfaces of the lens holder on which the two magnets are disposed, and
when viewed in a direction of the optical axis, the two magnets are disposed in the openings.

15. The camera module of claim 14, further comprising a stopper disposed above the lens holder,
wherein the stopper comprises a first portion and a second portion extending above the openings to respectively cover the two magnets.

* * * * *